United States Patent [19]

Glenn

[11] Patent Number: 4,529,620
[45] Date of Patent: Jul. 16, 1985

[54] METHOD OF MAKING DEFORMABLE LIGHT MODULATOR STRUCTURE

[75] Inventor: William E. Glenn, Fort Lauderdale, Fla.

[73] Assignee: New York Institute of Technology, Old Westbury, N.Y.

[21] Appl. No.: 574,928

[22] Filed: Jan. 30, 1984

[51] Int. Cl.³ .............................................. H04N 3/14
[52] U.S. Cl. ................................. 427/88; 156/280; 427/89; 427/93; 358/233; 358/240
[58] Field of Search ...................... 427/88, 89, 82, 93; 358/233, 234; 156/280

[56] References Cited

U.S. PATENT DOCUMENTS

| | | | |
|---|---|---|---|
| 3,541,992 | 11/1970 | Herrick | 358/234 |
| 3,882,271 | 5/1975 | Glenn | 358/233 |
| 4,441,791 | 4/1984 | Hornbeck | 372/49 |

OTHER PUBLICATIONS

Kozol, "Target Assembly for a Deformographic Display Device", IBM TDB, vol. 20, 11B, Apr. 1978, p. 4754.

Primary Examiner—John D. Smith
Attorney, Agent, or Firm—Martin M. Novack

[57] ABSTRACT

The disclosure is directed to improvements in a method of making a solid state light modulator structure for use in an apparatus for generating an image from a video signal. A semiconductor device is provided, the device having an array of spaced charge storage electrodes on a surface thereof. A layer of elastomer material, preferably a silicone gel, is applied over said surface. A plastic pellicle is applied over the elastomer layer. Layers of gold and silver are then successively applied over the pellicle layer.

6 Claims, 3 Drawing Figures

METHOD OF MAKING DEFORMABLE LIGHT MODULATOR STRUCTURE

BACKGROUND OF THE INVENTION

This invention relates to video display systems and, more particularly, to a method of making a deformable light modulator for use in a video display system. The subject matter of this application is related to the subject matter of my copending U.S. application Ser. No. 574,929, filed of even date herewith and assigned to the same assignee as the present application.

In recent years there have been developed techniques for displaying video information by storing a charge pattern representative of a video frame in a frame store and utilizing the charge pattern to modify a characteristic of a material. The modified characteristic of the material is then used to obtain a viewable image. In my U.S. Pat. No. 3,882,271, there is disclosed an apparatus wherein a charge pattern on a special semiconductor frame store is used to obtain deformations of a deformable material. The deformable material is disposed between an array of electrodes on the surface of the semiconductor device and a thin conductive layer which serves as both a common electrode and a light reflective layer. The deformable material and the thin conductive layer are deformed in response to the charge pattern on the array of electrodes with respect to the conductive layer. An optical subsystem, such as a Schleiren optical system, is then utilized to convert the pattern of deformations (or "ripples") in the thin conductive layer into a viewable image.

An important aspect of the described type of system is the operation of the conductive and reflective layer which is mounted on the deformable layer and must reliably and repeatably provide precise patterns of deformations in the reflective layer which correspond to the charge pattern on the array of electrodes. It has been found that the materials used for the deformable and conductive layers, as well as their dimensions, and their method of assembly, have a profound effect upon operating characteristics, and prior attempts to make solid state light modulators have met with one or more of the following deficiencies: insufficient sensitivity to the applied voltages; inadequate response characteristics as a function of time; and/or instability over the short and long term.

It is an object of the present invention to provide a method of making a deformable solid state light modulator structure which overcomes these problems.

SUMMARY OF THE INVENTION

The present invention is directed to improvements in a method of making a solid state light modulator structure for use in an apparatus for generating an image from a video signal. A semiconductor device is provided, the device having an array of spaced charge storage electrodes on a surface thereof. A layer of elastomer material, preferably a silicone gel, is applied over said surface. In accordance with a feature of the invention, a plastic pellicle is applied over the elastomer layer. At least one conductive layer is then applied over the pellicle layer.

In operation of the device made by the invented method, an input video signal results in selective application of voltages between the charge storage electrodes and the at least one conductive layer to cause deformations of the conductive layer and the elastomer layer. An optical subsystem is provided for converting deformations of the at least one conductive layer into an image, for example using a Schleiren optical system.

In the preferred embodiment of the invention, the step of applying at least one conductive layer comprises successively applying a first metal conductive layer over the pellicle layer and a second metal conductive and reflective layer over the first metal layer. The first and second conductive layers used herein are gold and silver layers, respectively.

Applicant has found that residual oils and/or other constituents invariably present in silicone gel material render it difficult to apply an appropriate conductive metal layer directly on top of the elastomer layer. Application of the pellicle layer solves this problem. Also, the desirably reflective silver does not evaporate directly on the plastic pellicle layer with sufficient uniformity. However, the initial evaporation of gold provides an excellent base layer upon which a uniform and highly reflective layer of silver can be evaporated.

Further features and advantages of the invention will become more readily apparent from the following detailed description when taken in conjunction with the accompanying drawings.

DESCRIPTION OF THE PREFERRED EMBODIMENT

Figure 1:
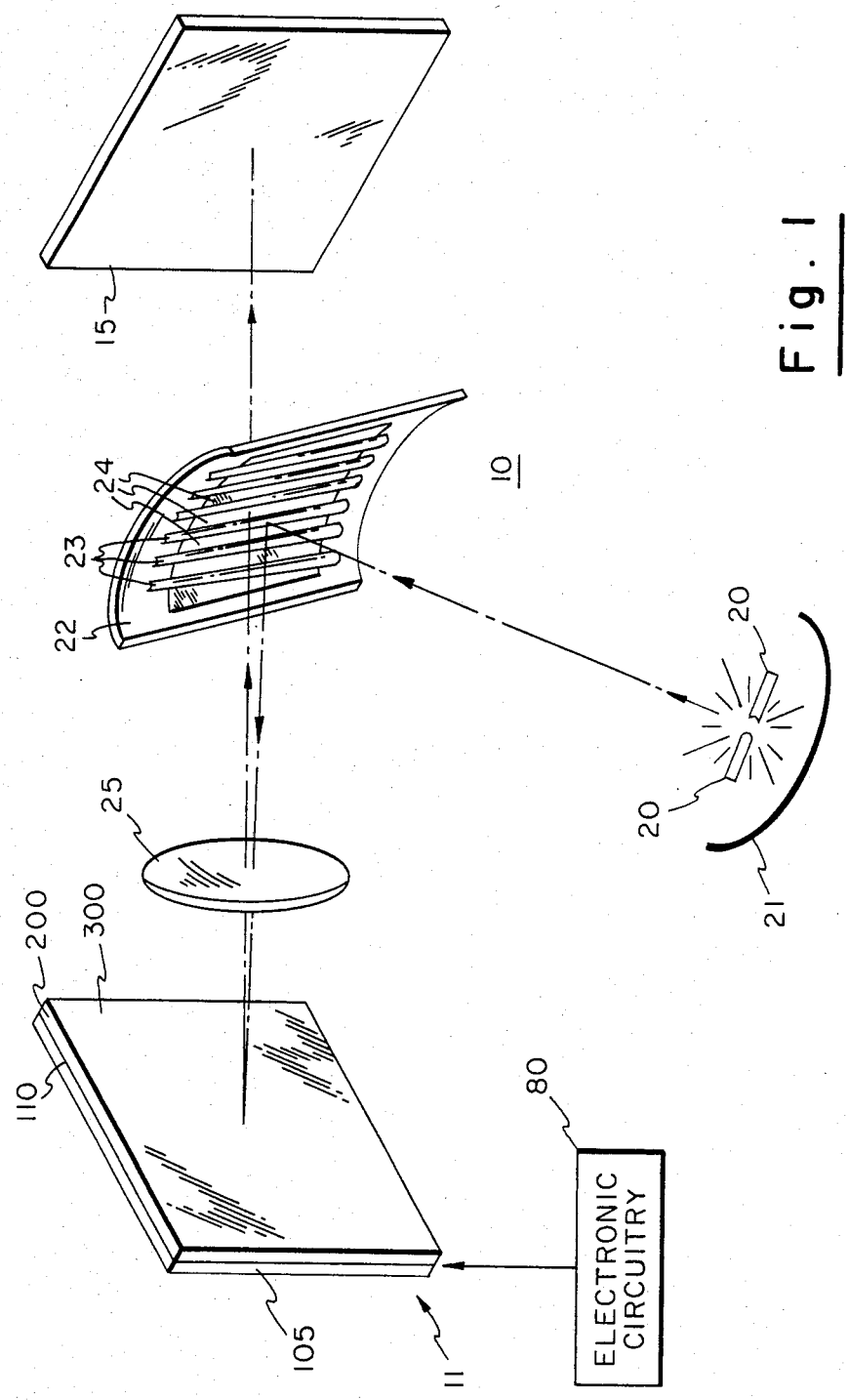
FIG. 1 is a block diagram, partially in schematic form, of a system for displaying images and which includes a deformable light modulator structure which can be made in accordance with the method of the invention as described in conjunction with the subsequent FIGURES.

Referring to FIG. 1, there is shown a simplified schematic diagram of an apparatus 10 which includes a device that can be made in accordance with an embodiment of the invented method. A solid state light modulator structure 100 includes a semiconductor substrate 105 having an array of semiconductor controlled storage units formed in a surface 110 thereof, and a layer of deformable material 200 which covers the surface 110. At least one reflective layer 300 of conductive material is disposed over the deformable layer 200. The semiconductor controlled storage unit array, and associated circuitry 80, receives and samples a video signal, the samples ultimately being stored as a charge pattern as between electrodes on the surface 110 of semiconductor 105 and the layer 300, which serves as a common electrode. The electric fields associated with the charge pattern result in forces which deform the deformable material 200 so that information is contained in the reflective layer 300 in the form of depressions or ripples which are similar to a phase diffraction grating. This information is then displayed on a screen 15, such as by using a Schlieren type of optical system.

The optical system depicted in FIG. 1 is of the type disclosed in my U.S. Pat. No. 3,084,590. In this system arc electrodes 20 generate an intense light source that is directed by a curved mirror 21 over a masking system 22 which includes a plurality of reflecting bars 23 separated by transparent areas or slits 24. The masking system 22 is positioned so that the light reflected from the bars 23 is transmitted toward a lens 25 where it is focused into relatively parallel rays. These rays are incident on the deformed reflective surface 300 and are reflected back through the lens 25 toward the masking system 22. If, at a given instant, there were no depressions on the surface 300 to divert the light rays, the rays effectively emanating from each bar 23 would be focused by lens 25 on a bar on the opposite side from which it originated and no light would be incident on the screen 15. However, if there are depressions in the surface 300 they will act as diffraction gratings and some light will be diffracted and ultimately pass through the slits 24. The portion of a light ray transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15.

Figure 2:
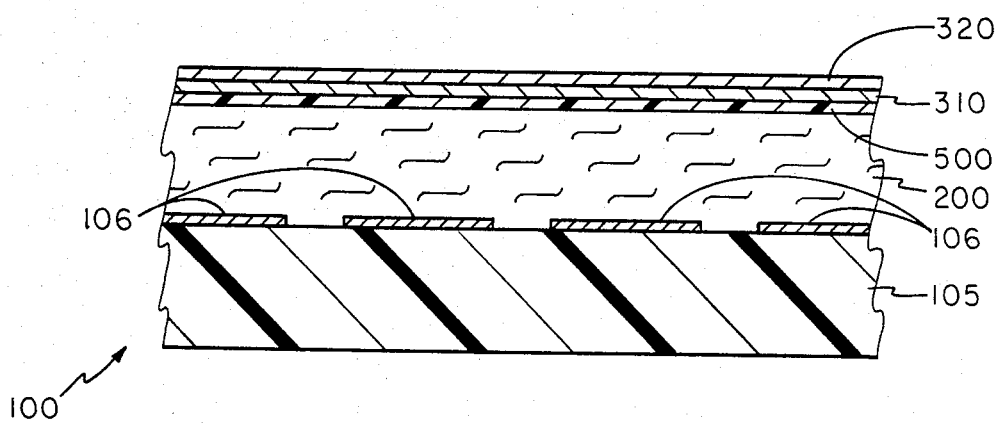
FIG. 2 is a cross-sectional view of the semiconductor device of the FIG. 1 embodiment, including an elastomer layer, pellicle layer, and conductive layers, made in accordance with the method of the invention.

Referring to FIG. 2, there is shown a cross-sectional view of the solid state light modulator 100 made in accordance with an embodiment of the invented method, and which had been shown generally in the FIG. 1 diagram. The basic structure of the semiconductor substrate 105 and an array of semiconductor controlled storage units formed therein, each including a display electrode 106, is known in the art. Reference can be made, for example, to the above referenced U.S. Pat. No. 3,084,590. With regard to the manner in which the video signal can be sampled and coupled to the display electrodes, reference can also be made, for example, to my copending U.S. patent application Ser. No. 557,941, filed Dec. 5, 1983, and assigned to the same assignee as the present application. A deformable elastomer layer 200 is disposed on the semiconductor device 105, and covers the display electrodes 106 thereof, as well as any areas of surface 110 between the display electrodes. It will be understood that a thin protective oxide layer (not shown) can be provided over the display region electrodes during manufacture of the semiconductor device, if desired. Disposed over the top surface of the elastomer 200 layer is a plastic pellicle layer 500. At least one, and preferably two conductive metal layers are disposed over the pellicle layer 500. In this embodiment these layers are a gold layer 310 which is covered by a silver layer 320.

In the described embodiment, the elastomer layer 200 is a silicone gel layer, for example of the type sold by Dow Corp. or General Electric Corp. under the trade names Dow Gel 3-6527 or G.E. RTV-6157, respectively. The silicone gel layer 200, can be applied by dipping of the semiconductor device into silicone gel and then drawing it out. Alternatively, the silicone gel can be applied to the surface of the semiconductor device and then a doctor blade used to obtain a uniform surface, or the material can be applied and then distributed by spinning the device.

It is important that the elastomer layer be neither too limber nor too stiff. The compliance of the gels are normally measured with a universal penetrometer. This has a shaft of 6.35 mm diameter and a weight of 19.5 gms. The penetration is measured in millimeters. These gels have a penetration that ranges from 3 mm to 30 mm. The thickness of the elastomer layer affects the sensitivity of the solid state light modulator, since it determines the distance (and therefore the force for a given electrical charge) between the display electrodes 106 and the common electrode (310 and 320 in FIG. 2) and is also determinative of the volume of deformable material on which the common electrode "floats". The thickness of the elastomer layer should be in the range between one-tenth and one times the average center-to-center spacing between adjacent active charge storage electrodes 106, and preferably about one-half such spacing. For an average electrode spacing of about 20 microns, the elastomer layer thickness should be between 2 and 20 microns, and preferably around 10 microns.

In the present embodiment, the pellicle layer 500 is formed separately by dissolving a cellulose nitrate material in a solvent, such as amylacetate and ethyl acetate, and then dropping the solution on water. After drying, the pellicle can be laid over the elastomer layer 200. The pellicle serves two purposes. First, applicant has found that residual oils and/or other constituents invariably present in the silicone gel material render it difficult to apply an appropriate thin uniform layer of conductive metal, such as gold, directly on top of the elastomer layer. Second, after application of the metal layer, the pellicle serves to isolate the metal layer from components of the elastomer that could attack and degrade the metal layer or layers disposed thereon. The pellicle layer should be sufficiently thin so as not to add undue stiffness to the light modulator structure, a thickness of less than about two microns being preferred.

In the present embodiment, a gold layer 310 is applied over the pellicle layer by evaporation, such as by placing the structure in a vacuum evaporation chamber and heating a gold source with a filament to obtain a layer of suitable thickness. A silver layer is then applied in the same way. The thicknesses of the gold and silver layers are preferably in the ranges 50 to 100 Angstroms and 100 to 1000 Angstroms, respectively. While a single layer could be used as the common electrode and reflective layer (e.g. layer 300 in FIG. 1), the silver layer does not evaporate directly onto the plastic pellicle layer with sufficient uniformity. The initial evaporation of gold provides an excellent base layer upon which a uniform and highly reflective layer of silver can be evaporated. It will be understood that alternative techniques of applying the one or more conductive layers can be employed, for example sputtering or electroless deposition.

Figure 3:
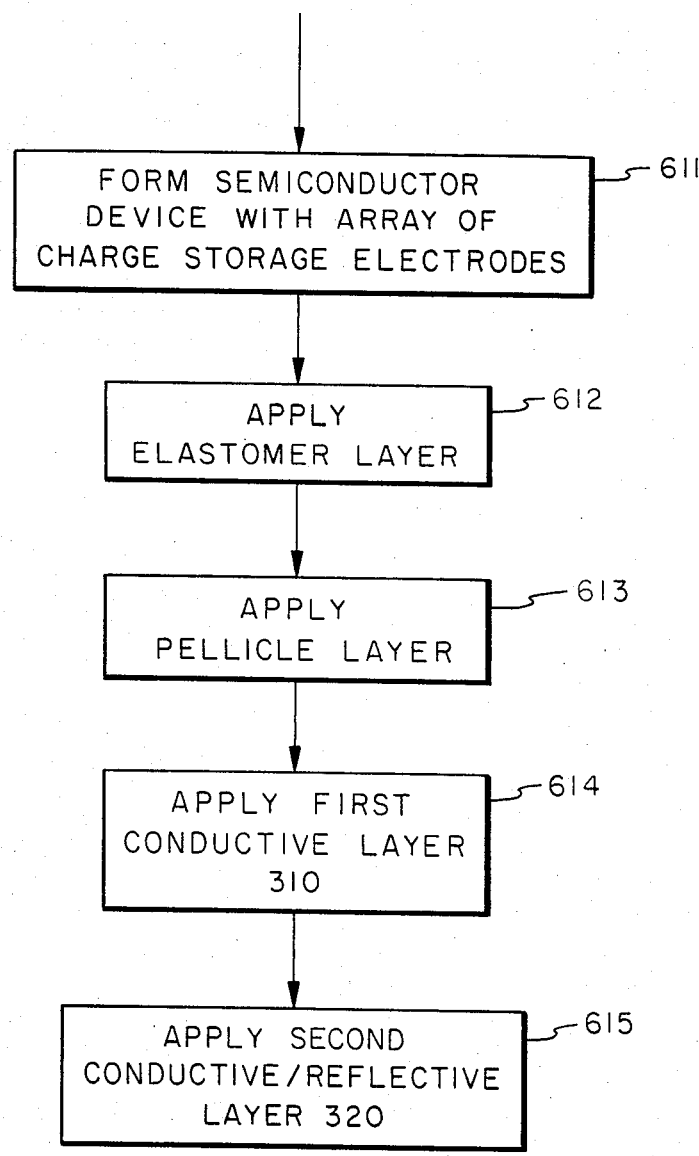
FIG. 3 is a diagram illustrating the steps used in fabricating the solid-state deformable light modulator structure, in accordance with an embodiment of the invention.

Referring to FIG. 3, there is shown a diagram of the method steps for making the solid state deformable light modulator in accordance with the described embodiment. The block 611 represents the formation of the semiconductor device having an array of charge storage electrodes on a surface thereof. The block 612 represents the application of the elastomer layer to the semiconductor surface, and the block 613 represents the application of the pellicle layer, as described. The blocks 614 and 615 then represent the application of the conductive and reflective layers 310 and 320, as described.

I claim:

1. A method of making a solid-state light modulator structure, comprising the steps of:
    providing a semiconductor device having an array of charge storage electrodes on a surface thereof:
    applying a layer of elastomer material over said surface;

applying a plastic pellicle over said elastomer layer; and applying at least one conductive layer over said pellicle layer.

2. The method as defined by claim 1, wherein said step of applying a layer of elastomer material comprises applying a layer of silicone gel.

3. The method as defined by claim 1, wherein said step of applying at least one conductive layer comprises successively applying a first metal conductive layer over said pellicle layer and a second metal conductive and reflective layer over said first metal layer.

4. The method as defined by claim 2, wherein said step of applying at least one conductive layer comprises successively applying a first metal conductive layer over said pellicle layer and a second metal conductive and reflective layer over said first metal layer.

5. The method as defined by claim 3, wherein said step of applying a first metal layer comprises applying a layer of gold, and said step of applying a second metal layer comprises applying a layer of silver.

6. The method as defined by claim 4, wherein said step of applying a first metal layer comprises applying a layer of gold, and said step of applying a second metal layer comprises applying a layer of silver.

* * * * *